E. F. STECK.
CALCULATING RULE.
No. 11,450. Reissued Oct. 23, 1894.
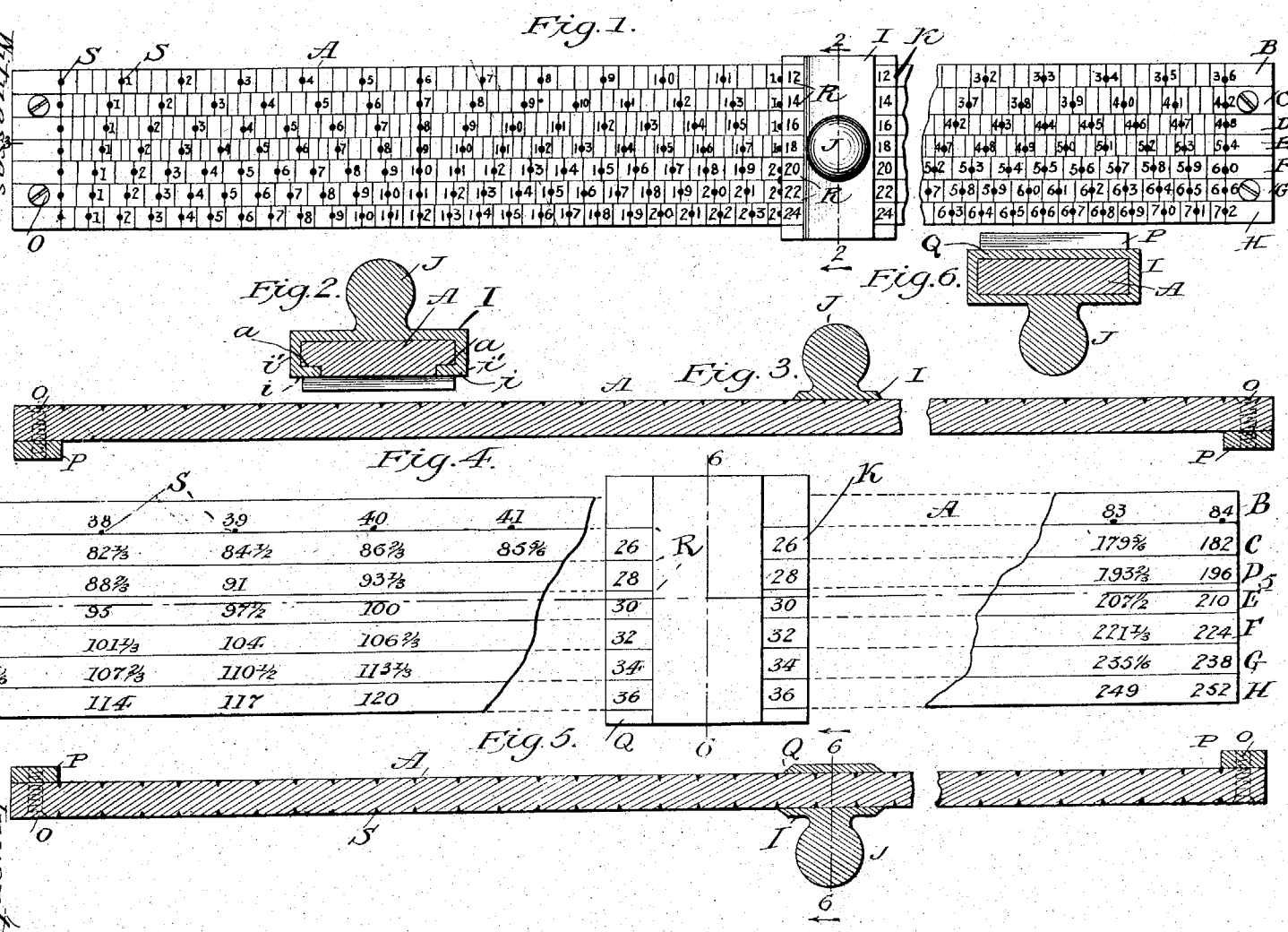
Witnesses,
Edna B. Johnson
Wm. H. Youmans
Inventor,
By E. F. Steck.
Elliott & Hopkins
Attys.

UNITED STATES PATENT OFFICE.

ERNST F. STECK, OF CHICAGO, ILLINOIS.

CALCULATING-RULE.

SPECIFICATION forming part of Reissued Letters Patent No. 11,450, dated October 23, 1894.

Original No. 515,978, dated March 6, 1894. Application for reissue filed April 11, 1894. Serial No. 507,182.

*To all whom it may concern:*

Be it known that I, ERNST F. STECK, a citizen of the United States, residing at Chicago, in the county of Cook and State of Illinois, have invented certain new and useful Improvements in Calculating-Scales, of which the following is a full, clear, and exact specification.

My invention relates to scales or devices for calculating the superficial area of rectangular surfaces, when two of the dimensions or the length and breadth are known; and it is more especially designed for use as a lumberman's rule, for ascertaining the square measure of boards.

The object of my invention is to provide a scale of this character, which shall be of a more convenient and handy form, and to greatly reduce the dimensions of the scale, without, however, reducing its measuring capacity.

With these ends in view, my invention consists in certain features of novelty, by which the said objects and certain other objects hereinafter described are accomplished, as fully explained with reference to the accompanying drawings and more particularly pointed out in the claims.

In the said drawings, Figure 1, is a face view of my improved scale, a portion at a point between the ends thereof being broken away. Fig. 2, is a transverse section thereof, taken through the slide on the line 2—2, Fig. 1. Fig. 3, is a longitudinal section, taken on the line 3—3, Fig. 1. Fig. 4, is a view of the under side of the scale embodying a modification of my invention. Fig. 5, is a longitudinal section of the same, taken on the line 5—5, Fig. 4, and Fig. 6, is a transverse section of the same taken through the slide, on the line 6—6, Figs. 4 and 5.

In the drawings, wherein the same signs of reference indicate the same or like parts throughout the several views, A is a plate or strip, composed of any suitable material, such as bone, wood, metal, or composition, but preferably metal, which is divided longitudinally into a number of scales corresponding to the number of different widths of boards or surfaces that it might be desired to measure. The first of these scales, B, which, as shown in Fig. 1, is provided with graduations numbered from 1 to 36, indicates the width of the surface to be measured, and the succeeding scales, C, D, E, F, G, H, which, with a width scale divided into thirty-six parts, as here shown, should be divided respectively into graduations numbered from 1 to 42, 1 to 48, 1 to 54, 1 to 60, 1 to 66, and 1 to 72. Arranged upon this plate A, and extending across the face thereof, is a slide I, provided with any suitable operating knob or button, J, and having on both sides in line with the graduated scales, B, C, D, &c., a series of numbers, which indicate the lengths of the boards to be measured. These numbers on the slide, indicate the length in feet, while the numbers on the scale B, indicate the width in inches; and it will be seen that the spaces on the slide opposite the scales, B, C, D, &c., respectively, are numbered from 12 to 24, the numbers increasing successively by two, which conforms to the usual manner of measuring lumber, as the odd feet are not counted.

From the foregoing, the manner of using the scale will be readily understood. The number found upon the plate A, at the point of conjunction of the figures indicating the width and length of the board or surface, is the number of square feet in that surface: for example: if a board be seventeen inches wide and eighteen feet long, to ascertain the square feet in said board, it is only necessary to move the slide until the edge thereof registers with the number 17 on the scale B, which always indicates the width, and then following down the column of figures on the slide to the number which indicates the length, 18, it will be found that the point of conjunction between the number 18 on the slide and the graduations on the rule is at 25½, which means twenty-five and one-half feet, the number of square feet in the board of the dimensions specified.

The scale shown in Fig. 1, is capable of measuring a board thirty-six inches wide and twenty-four feet long, but it is very obvious that the capacity of the scale may be increased as desired, by arranging the top line of figures closer together, so as to have graduations of the same value in a smaller scale, but at a shorter distance apart, and rearranging the succeeding rows of numbers C, D, E, &c., accordingly. In the prior construction before referred to, the scale, or line of numbers corresponding to the scale B, is divided into inches, that is, into spaces each an inch long, but in my device, the spaces or graduations are of arbitrary length and need only be sufficiently far apart or of sufficient length to afford room for placing the numbers indicating their values thereon. Hence, it is very evident that a scale for measuring surfaces of great width and length, may, according to my invention, be constructed on a comparatively short strip or plate, or upon a strip or plate not too long to be conveniently carried about by the user.

The additional scale, K, on the slide I, is for the purpose of registering with numbers on the scales B, C, D, &c., at the extreme limit or right-hand end of the plate, where the numbers would be covered under the slide when the latter has reached the limit of its movement in that direction.

The plate A, on its under side, is preferably provided at each edge with a rabbeted portion *a*, in which fit in-turned flanges *i*, formed on the side-pieces *i'*, of the slide I, thus holding the slide securely in place, with capability of being readily slipped along the plate from end to end. At each end of the plate A, preferably on the under side thereof, is secured by means of screws, O, or otherwise, a block P, which limits the movement of the slide I and prevents the same from being slipped entirely off at either end of the plate, and at the same time subserves the further useful purpose of feet or supports, which, elevating the plate from the table or other surface upon which it might be resting when in operation, permits the free movement of the slide.

In the form shown in Fig. 1, the device is adapted for measuring surfaces from twelve to twenty-four feet in length, but should it be desired to increase or double the capacity of the rule, as thus constructed, the plate A and the slide I, may be divided into a greater number of longitudinal scales B, C, D, &c. This, however, would necessarily increase the dimensions of the apparatus to a greater or less extent and therefore, it is preferable to accomplish this result by providing the plate A with the graduated scales B, C, D, &c., on both sides alike, as shown in Figs. 4 and 5; and in this event, the slide I would be provided on the under side, with a cross piece Q, which is also provided at each side with a scale or series of numbers indicating the lengths of the boards to be measured. The numbers on these scales, however, should begin where the numbers of the scales on the upper side of the slide leave off; that is to say, if the highest number on the face of the slide is 24, the lowest number or beginning of the scale on the under side of the slide, would be 26, and the succeeding numbers would increase successively by two throughout the extent or length of the scales, as before described, thus doubling the capacity of the scale without increasing its dimensions. When the double scale is used, however, the rabbeted portions *a*, in the plate A, employed in the form before described, may be omitted, and the slide formed into an integral rectangular loop or strap, as more clearly shown in Fig. 6, which completely surrounds the plate A. In each instance, the edges of the slide I, upon which the length scales are formed, may, if desired, be beveled or inclined downwardly, so as to bring their division lines R, close to the longitudinal division lines of the scales B, C, D, &c., whereby it may be more accurately and readily determined which lines are coincident.

In the drawings, I have represented the plate A as provided with slight indentations or cavities, S, which more readily define the divisions or graduations to which the numbers on the scales B, C, D, &c., refer; but it is quite obvious that any other mark or a heavy line at such places might also be used, or, indeed, no marks or lines at all, other than the mere graduation lines, need be used, without departing from the spirit of my invention. It is also quite obvious, so far as the mechanical construction of my invention is concerned, that the numbers on the various scales may be considered as representing yards, feet, miles or any desired units of measure; or the numbers and graduated scales might be employed to calculate any other amounts, so long as the mechanical construction of my invention is employed.

Having thus described my invention, what I claim as new therein, and desire to secure by Letters Patent, is—

1. The combination of a plate or strip having formed longitudinally thereon on one side, a series of scales, and on the other side similar scales forming a continuation of said first scales, and a double slide arranged on said plate or strip and having on one side a scale extending transversely of said plate or strip and bearing signs or characters, adapted to register respectively with the scales on said plate or strip, and a similar scale on the other side of said slide forming a continuation of the first said scale on said slide, substantially as set forth.

2. In a lumberman's rule, the combination of a plate having marked thereon a series of longitudinal graduated scales bearing numbers indicating width and the square measure of rectangular surfaces, each of said scales beginning with the same number, but each successive scale containing more numbers than the preceding one, and a slide arranged on said plate and having at its edge a scale extending transversely of the aforesaid scales and bearing numbers indicating length and increasing successively by two and adapted to register respectively with the numbers of the scales indicating width, substantially as set forth.

3. In a lumberman's rule, a plate or strip having a series of longitudinally arranged scales, in combination with a movable slide arranged thereon and having a transverse scale bearing characters indicating length and registering respectively with the scales of said series, one of said longitudinal scales having signs indicating width and the others having numbers equal respectively to the square measures of surfaces whose lengths and breadths correspond respectively with the characters in the said length and breadth scales, and each of the said numbers which indicate the square measure, being so arranged as to be substantially in line with the indicating edge of said slide when such edge is placed at the character indicating the width of the surface to be measured, substantially as set forth.

ERNST F. STECK.

Witnesses:
R. C. OMOHUNDRO,
F. A. HOPKINS.